US006937357B1

(12) United States Patent
Vincent et al.

(10) Patent No.: US 6,937,357 B1
(45) Date of Patent: Aug. 30, 2005

(54) HARD COPY SYSTEM INCLUDING REWRITABLE MEDIA

(75) Inventors: Kent D. Vincent, Cupertino, CA (US); R. Stanley Williams, Redwood City, CA (US); Xiao-An Zhang, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 499 days.

(21) Appl. No.: 10/016,560

(22) Filed: Oct. 30, 2001

(51) Int. Cl.[7] .............................................. G06F 15/00

(52) U.S. Cl. ...................................... 358/1.16; 358/1.9

(58) Field of Search ................................ 358/1.18, 1.9, 358/1.16; 428/1, 195, 913, 64.8; 347/14

(56) References Cited

U.S. PATENT DOCUMENTS

| | | | |
|---|---|---|---|
| 5,604,027 A | 2/1997 | Sheridon | 428/323 |
| 6,011,570 A * | 1/2000 | Muranaka et al. | 347/171 |
| 6,124,851 A | 9/2000 | Jacobson | 345/206 |
| 6,544,601 B1 * | 4/2003 | Kong | 156/277 |

* cited by examiner

*Primary Examiner*—Twyler Lamb

(57) ABSTRACT

The present invention provides a printer and media solution that is conducive to briefcase-compatible compactness, battery operation, and media reuse. The printer consists of a low power, electrode array that images the surface of a paper-like, rewritable sheet. The sheet is responsive to pixel-sized electric fields produced by each electrode, resulting in a pixel array that is imaged in response to field polarity. The sheet is coated with a rewritable colorant that is a highly energy efficient, bistable, bi-modal molecular layer, requiring energy only to change an image, not to hold or illuminate it.

34 Claims, 3 Drawing Sheets

HARD COPY SYSTEM INCLUDING REWRITABLE MEDIA

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO AN APPENDIX

The present application includes a hard copy appendix comprising pertinent specification pages and drawings of co-inventors' U.S. patent application Ser. No. 09/844,862, filed Apr. 27, 2001, by ZHANG, WILLIAMS and VINCENT for MOLECULAR MECHANICAL DEVICES WITH A BAND GAP CHANGE ACTIVATED BY AN ELECTRIC FIELD FOR OPTICAL SWITCHING APPLICATIONS as relates to subject matter claimed in accordance with the present invention.

BACKGROUND OF THE INVENTION

1. Field of the Invention

The present invention relates generally to hard copy apparatus, more particularly to printing and methods employing rewritable media, and specifically to printing systems adapted for a rewritable media using a coating of a bistable, bi-modal molecular colorant that is electrical field switchable.

2. Description of Related Art

Electrostatically polarized, bichromal particles for displays have been known since the early 1960's. The need for an electronic paper-like print means has recently prompted development of at least two electrochromic picture element (pixel) colorants: (1) a microencapsulated electrophoretic colorant (see e.g., U.S. Pat. No. 6,124,851 (Jacobson) for an ELECTRONIC BOOK WITH MULTIPLE PAGE DISPLAYS, E Ink Corp., assignee), and (2) a field rotatable bichromal colorant sphere (see e.g., U.S. Pat. No. 5,604,027 (Sheridon, assignee Xerox Corp.). Each of these electrochromic colorants is approximately hemispherically bichromal, where one hemisphere of each microcapsule is made the display background color (e.g., white) while the second hemisphere is made the print or image color (e.g., black or dark blue). The colorants are field translated or rotated so the desired hemisphere color faces the observer at each pixel. In commercial practice, these Xerox™ and E Ink™ products rely upon a constant electrical field to maintain an image on a screen or other forms of media employing such technology.

Assignee herein, Hewlett-Packard Company, has gone beyond these microcapsule-based colorant technologies by creating a bi-modal molecular colorant having a variety of uses, including for displays and rewritable media. In some embodiments, the molecules are also bistable, meaning that an electronic holding field is not necessary to maintain a particular state. The term "rewritable" as used herein should be understood to mean writable and erasable. In the main, the goal of such electronic rewritable product development is to provide a means for producing electronic images that truly resembles hard copy in appearance and readability. The Appendix hereto provides a detailed description of one of the Hewlett-Packard™ inventions in this field of technology.

Mobile computers of the "laptop," "notebook," and "palmtop" styles and telecommunication devices employing a visual display are typically used during business travel or otherwise away from the office and consequently must be lightweight, fit comfortably within a standard briefcase or handbag, and be battery operated. These same mobile devices have commensurately small, low resolution displays, generally usually liquid crystal technology displays ("LCD") that are restricted to displaying only a few words or, at best, a few lines, of text. Such displays severely limit the device-human interface; they are difficult to read due to low contrast and narrow-included viewing angle. With the increase in the use of such mobile computer and telecommunication devices, there is a growing, unfilled need for small, mobile, hard copy printing appliances and printers that are integrated into, or adapted for use with, such mobile computer and telecommunication devices.

While state of the art printing is a convenient alternative to reading poorer quality, electronic, visual display information, mobile computer and telecommunication device users typically do not carry, nor want to carry, portable inking printers (e.g., the commercially available HP™ portable DeskJet™ series) and a supply of paper in mobile work situations. Furthermore, what would be printed is generally read once and discarded or kept only for a short working period. Mobile computing and telecommunication applications, therefore, are ideally suited for printing on media that can be reused many times, i.e., a rewritable medium.

Conventional printer technologies are not conducive to the aforementioned needs of mobile appliances. Ink, toner, and thermal-based technologies produce relatively permanent prints, but are typically not briefcase compatible, and require power in excess of adequate, small cell, battery operation.

There is a need for a convenient portable printing apparatus and rewritable media system.

BRIEF SUMMARY OF THE INVENTION

The present invention generally provides a printer and media solution that is conducive to briefcase-compatible compactness, battery operation, and media reuse. The printer consists of a low power, electrode array that images the surface of a paper-like, sheet of rewritable media. The sheet is responsive to pixel-sized electric fields produced by each electrode, resulting in a pixel array that is imaged in response to field polarity. The sheet is coated with a rewritable colorant that is, preferably, a highly energy efficient, bistable, bi-modal molecular layer, requiring energy only to change an image, not to hold or illuminate it.

In its basic aspect, the present invention provides a printing system including: rewritable media having a bistable, electrochromic, colorant layer susceptible to localized electrical fields; and associated with said media, an electrode subsystem producing said localized electrical fields; in a preferred embodiment the electrochromic colorant layer includes at least one layer of a molecular colorant coating wherein molecules of the coating are at least bichromal and subjectable to bistable switching between color states under influence of said localized electric field.

In another aspect, the present invention provides a hard copy printing method including: selectively providing localized electric fields, each of said filed conforming to a predetermined picture element size; transporting a printing medium across said fields such that a bistable electrochromic colorant layer of said medium is subjected to said electric fields; and manipulating said electric fields to produce printed data onto said electrochromic colorant layer.

In another aspect, the present invention provides method of doing business, the method including: providing a printing apparatus including an electrode subsystem for providing selectively localized electric fields corresponding to picture elements printable from digital data; providing a rewritable media instrument susceptible to said fields wherein said media instrument is associated with a service and use fees associated therewith; and printing and reprinting legible information on said media instrument associated with said use fee and a current balance with said stationary printing apparatus whenever said media instrument is used in association with said printing apparatus.

The foregoing summary is not intended by the inventors to be inclusive of all the aspects, objects, advantages and features of the present invention nor should any limitation on the scope of the invention be implied therefrom. This Summary is provided in accordance with the mandate of 37 C.F.R. 1.73 and M.P.E.P. 608.01(d) merely to apprise the public, and more especially those interested in the particular art to which the invention relates, of the nature of the invention in order to be of assistance in aiding ready understanding of the patent in future searches. Other objects, features and advantages of the present invention will become apparent upon consideration of the following explanation and the accompanying drawings, in which like reference designations represent like features throughout the drawings.

BRIEF DESCRIPTION OF THE DRAWINGS

In accordance with 37 C.F.R. 1.84(u), in order to prevent confusion with FIGURES of the Appendix hereto, the drawings of this application use double capital letter suffices.

Figure 1A:
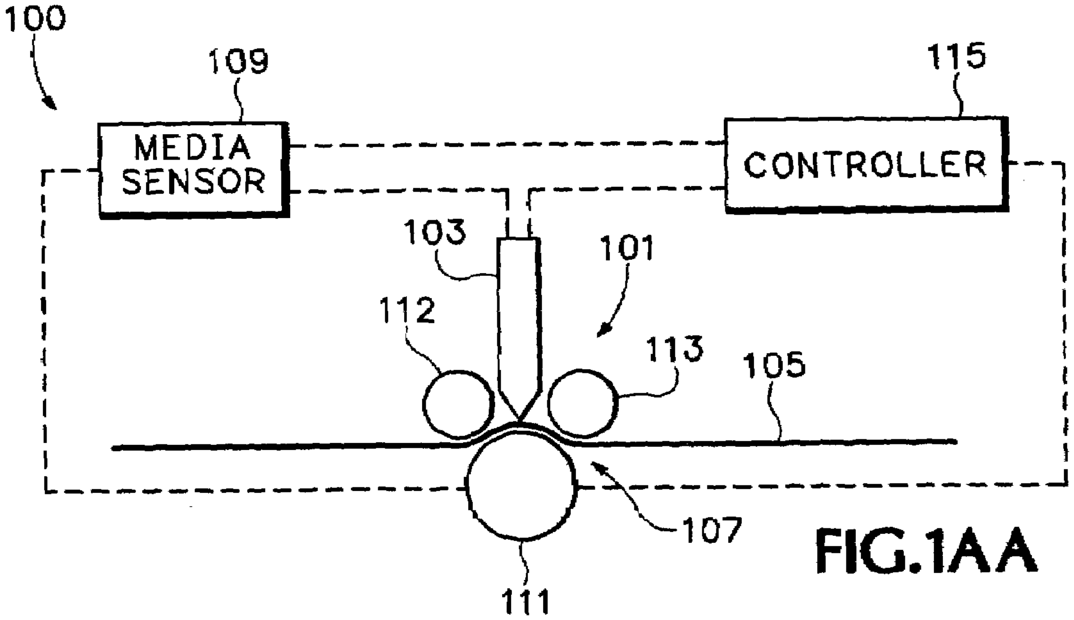
FIG. 1AA is a schematic depiction of basic elements of a printing system in accordance with the present invention.

The drawings referred to in this specification should be understood as not being drawn to scale except if specifically annotated.

DETAILED DESCRIPTION OF THE INVENTION

Reference is made now in detail to a specific embodiment of the present invention, which illustrates the best mode presently contemplated for practicing the invention. Alternative embodiments are also briefly described as applicable.

Definitions

The following terms and ideas are applicable to both the present discussion and the Appendix hereto.

The term "self-assembled" as used herein refers to a system that naturally adopts some geometric pattern because of the identity of the components of the system; the system achieves at least a local minimum in its energy by adopting this configuration.

The term "singly configurable" means that a switch can change its state only once via an irreversible process such as an oxidation or reduction reaction; such a switch can be the basis of a programmable read-only memory (PROM), for example.

The term "reconfigurable" means that a switch can change its state multiple times via a reversible process such as an oxidation or reduction; in other words, the switch can be opened and closed multiple times, such as the memory bits in a random access memory (RAM) or a color pixel in a display.

The term "bistable" as applied to a molecule means a molecule having two relatively low energy states (local minima) separated by an energy (or activation) barrier. The molecule may be either irreversibly switched from one state to the other (singly configurable) or reversibly switched from one state to the other (reconfigurable). The term "multi-stable" refers to a molecule with more than two such low energy states, or local minima.

The term "bi-modal" for colorant molecules in accordance with the present invention may be designed to include the case of no, or low, activation barrier for fast but volatile switching. In this latter situation, bistability is not required, and the molecule is switched into one state by the electric field and relaxes back into its original state upon removal of the field; such molecules are referred to as "bi-modal". In effect, these forms of the bi-modal colorant molecules are "self-erasing". In contrast, in bistable colorant molecules the colorant molecule remains latched in its state upon removal of the field (non-volatile switch), and the presence of the activation barrier in that case requires application of an opposite field to switch the molecule back to its previous state. Also, "molecular colorant" as used hereinafter as one term to describe aspects of the present invention is to be distinguished from other chemical formulations, such as dyes, which act on a molecular level; in other words, "molecular colorant" used hereinafter signifies that the colorant molecules as described in the Appendix and their equivalents are employed in accordance with the present invention.

Micron-scale dimensions refers to dimensions that range from 1 micrometer to a few micrometers in size.

Sub-micron scale dimensions refers to dimensions that range from 1 micrometer down to 0.05 micrometers.

Nanometer scale dimensions refers to dimensions that range from 0.1 nanometers to 50 nanometers (0.05 micrometers).

Micron-scale and submicron-scale wires refers to rod or ribbon-shaped conductors or semiconductors with widths or diameters having the dimensions of 0.05 to 10 micrometers, heights that can range from a few tens of nanometers to a micrometer, and lengths of several micrometers and longer.

"HOMO" is the common chemical acronym for "highest occupied molecular orbital", while "LUMO" is the common chemical acronym for "lowest unoccupied molecular orbital". HOMOs and LUMOs are responsible for electronic conduction in molecules and the energy difference between the HOMO and LUMO and other energetically nearby molecular orbitals is responsible for the color of the molecule.

An "optical switch," in the context of the present invention, involves changes in the electromagnetic properties of the molecules, both within and outside that detectable by the human eye, e.g., ranging from the far infra-red (IR) to deep ultraviolet (UV). Optical switching includes changes in properties such as absorption, reflection, refraction, diffraction, and diffuse scattering of electromagnetic radiation.

The term "transparency" is defined within the visible spectrum to mean that optically, light passing through the colorant is not impeded or altered except in the region in which the colorant spectrally absorbs. For example, if the molecular colorant does not absorb in the visible spectrum, then the colorant will appear to have water clear transparency.

The term "omni-ambient illumination viewability" is defined herein as the viewability under any ambient illumination condition to which the eye is responsive.

As a general proposition, "media" in the context of the present invention includes any surface, whether portable or fixed, that contains or is layered with a molecular colorant or a coating containing molecular colorant in accordance with the present invention wherein "bistable" molecules are employed; for example, both a flexible sheet exhibiting all the characteristics of a piece of paper and a writable surface of an appliance (be it a refrigerator door or a computing appliance using the molecular colorant). "Display" (or "screen") in the context of the present invention includes any apparatus that employs "bi-modal" molecules, but not necessarily bistable molecules. Because of the blurred line regarding where media type devices ends and display mechanisms begin, no limitation on the scope of the invention is intended nor should be implied from a designation of any particular embodiment as a "media" or as a "display."

As will become apparent from reading the Detailed Description and Appendix, "molecule" can be interpreted in accordance with the present invention to mean a solitary molecular device, e.g., an optical switch, or, depending on the context, may be a vast array of molecular-level devices, e.g., an array of individually addressable, pixel-sized, optical switches, which are in fact linked covalently as a single molecule in a self-assembling implementation. Thus, it can be recognized that some molecular systems comprise a super-molecule where selective domain changes of individual molecular devices forming the system are available. The term "molecular system" as used herein refers to both solitary molecular devices used systematically, such as in a regular array pixel pattern, and molecularly linked individual devices. No limitation on the scope of the invention is intended by interchangeably using these terms nor should any be implied.

Specific Embodiments

Turning to FIG. 1AA, a printing system 100 in accordance with the present invention has two main components: a printing subsystem 101 (referred to hereinafter more simply as "printer 101") and an erasably-writable printing medium 105. The printer 101 includes an electrode array 103 and a media transport subsystem 107. The electronics package associated with powering the various subsystems for data handling, printing, and media transport is shown as a generic "controller" 115; such controls are well known in the state of the art. Known manner associated electronic circuitry and software, or firmware, to download, store, sequence and print alphanumeric text and images (e.g. an application specific integrated circuit, ASIC, with appropriate buffers and memory can be employed) and to provide power (e.g., battery) is provided. The present invention uses circuitry common to conventional computer interfaced printers to input, store, sequence and print image data. The printer may be directly interfaced to a computer (e.g., direct line connection or wireless) for printing or may print pre-downloaded images from a memory.

Rewritable media 105 is described in detail in co-pending U.S. patent application Ser. No. 09/919,394, filed Jul. 31, 2001, by Kent Vincent et al. As illustrated schematically in a magnified partial view in FIGS. 2AA, 2BB, electronic print media in accordance with one embodiment of the invention describe in the co-pending application comprises an electrochromic coating 202 affixed superjacently to a backing 201 substrate. The electrochromic molecular colorant coating 202 layer (on the order of a few microns) contains bi-modal, and preferably bistable, electrochromic molecules that undergo conformational changes as a result of application of an electric field that in effect changes selectively localized regions of this coating from one hue to another. This can be thought of as millions of molecular switching devices per cubic micron of colorant. A comprehensive description of the molecular system is described in the Appendix hereto.

Figure 2A:
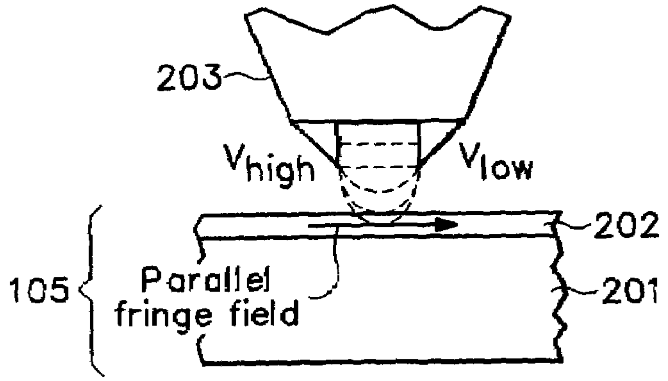
FIG. 2AA is a schematic depiction of a parallel fringe field printhead of an electrode array of the system as shown in FIG. 1AA.

As demonstrated by FIGS. 2AA and 2BB, in the main part, in a principal embodiment of the printing there is provided a flexible substrate 201 (e.g., plastic) that has been coated with a molecular colorant 202. The bichromal molecular switching devices of the molecular colorant 202 are selectively switched back-and-forth between bistable states (e.g., black and transparent) by an applied electric field, changing the polarity of the field to change the states of selected picture elements ("pixels"). In the preferred embodiment, the medium 105 is not attached to the printer 101.

Returning also to FIG. 1AA, the printhead 103 includes an electrode array 107 of individual electrodes 203, 204 as demonstrated by either FIG. 2AA or 2BB, respectively. The printhead 103 can comprise a sheet-wide linear array, or equivalent staggered array, of electrodes in contact or near contact with the media 105 surface. Electrode arrays and drive electronics are common to electrostatic printers and their constructions and interfaces are well known. For example, Sheridon in U.S. Pat. No. 5,389,945, Feb. 14, 1995, describes an electrode array printer for printing on re-writable paper. Each is sized, positioned, and electrically addressed in a known manner to provide an appropriate electric field to the colorant layer 202 at each given pixel location (or superset of pixels) along a pixel column (or columns if a staggered array) of the rewritable medium 105.

Figure 2B:
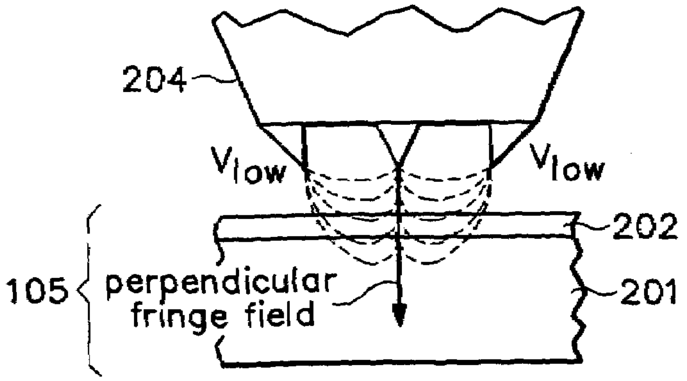
FIG. 2BB is a schematic depiction of a perpendicular fringe field printhead of an electrode array of the system as shown in FIG. 1AA FIG. 3AA is a schematic illustration of a computer printer apparatus embodiment in operation in accordance with the present invention as shown in FIG. 1AA.

Exemplary "fringe field" electrodes are also depicted in FIGS. 2AA and 2BB. The electrical field may be oriented perpendicular to the plane of the print medium 105 as in FIG. 2BB or parallel to it as in FIG. 2AA. In the exemplary embodiment, a common electrode, or set of electrodes, is placed adjacent to the medium 105 virtual pixel array so that printing is accomplished by passage of fringe fields through the colorant 202. The fringe field is illustrated by dashedlines labeled "$V_{high}$" and "$V_{low}$". The field is concentrated under the electrode tip and the return field is dispersed and therefor does not effect the colorant layer. Fringe field imaging is advantageous since the electric field is not significantly influenced by the physical structure of the substrate.

The printhead array 103 can be fabricated in accordance with known manner integrated circuit and thin film technologies, thereby providing an electrode array 103 of individual printheads 203, 204 in combination with the molecular colorant 202 of the medium 105 having the ability to produce a pixel resolution at least equivalent to the best commercial printers, e.g., 1200 dots per inch in the current state of the art. Importantly, such electrode arrays can be low powered, requiring only a lightweight battery.

Returning again to FIG. 1AA, a medium transport mechanism 107 exemplary embodiment is shown. A support roller 111 is subjacent the electrode array 103. Note that for the electrode type of FIG. 2BB, the support roller 111 can serve optionally as the perpendicular fringe field electrode. A pair of drive rollers 113, 114 are suitably mounted so that the medium 105 passes through nips between the drive rollers 113, 114 and support roller 111. In order to ensure uniform printing, a reversible motor drive (not shown) can be connected to the drive rollers 113, 114 to provide bidirectional motion of the medium 105 through the nips. Note that it is possible to implement the transport 105 as known manner spring-loaded set of rollers 111, 112, 113 which provide a resistance to a hand-feed operation of the printer system 100. A known manner medium translation-position sensor 109 is connected between the transport mechanism 107 and the electrode array 103. The media translation-position sensor 109 is used to sense the instantaneous pixel row location of the printing medium 105 relative to the electrode array 103 to time printing pulses. The sensor 109 may also be used to detect the start and end positions of medium travel. A number of different sensing schemes are applicable (e.g., a known manner shaft encoder attached to the axis of a roller engaged with the sheet, a sheet texture sensor (e.g., assignee Hewlett-Packard's U.S. Pat. No. 5,089,712 and U.S. Pat. No. 5,825,044), or a known manner linear encoder positioned to read a coding track along the sheet, or the like).

Thus, the rewritable medium 105 may be transported by manually pulling the rewritable sheet thought the printer or by a common motor servo and engaged roller system. The rewritable medium 105 sheet is imaged by printing a column of pixels one row at a time as the sheet is passed relative to the electrode array 103.

Because of the nature of the molecular colorant employed in accordance with the preferred embodiments of the present invention (see Appendix), it should be noted that in alternative embodiments the printer may be adapted to a plethora of implementations. The present invention is easily adapted to dedicated-use printers, such as a cylindrical glassware printer, common document-style and single-swipe handheld printers (e.g. for labeling). For example, the printhead 103 can be adapted to engage with the surface of a moving object which has a coating of the molecular colorant 202 thereon such as to print on a so-coated label of a spinning chemical beaker. Similarly, there are reusable objects, such as clinical and chemical laboratory glassware, shipping containers and retail price stickers that must be re-labeled with each use to indicate, for example, contents, shipping address or price, respectively. These labels commonly contain both human readable and machine readable (bar code) information. In many applications, it is highly desirable to fully automate labeling to avoid the cost of human intervention (e.g. removing old label). Using the rewritable media and electrode printer of the present invention, permanent labels may be affixed to these objects, printed, erased and reprinted with each repeated use.

Figure 5A:
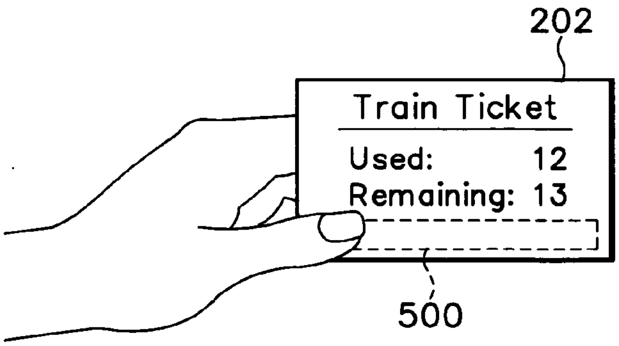
FIGS. 5AA and 5BB depict a stationary printer version embodiment of the present invention as described with respect to FIGS. 1AA–2BB.
Figure 5B:
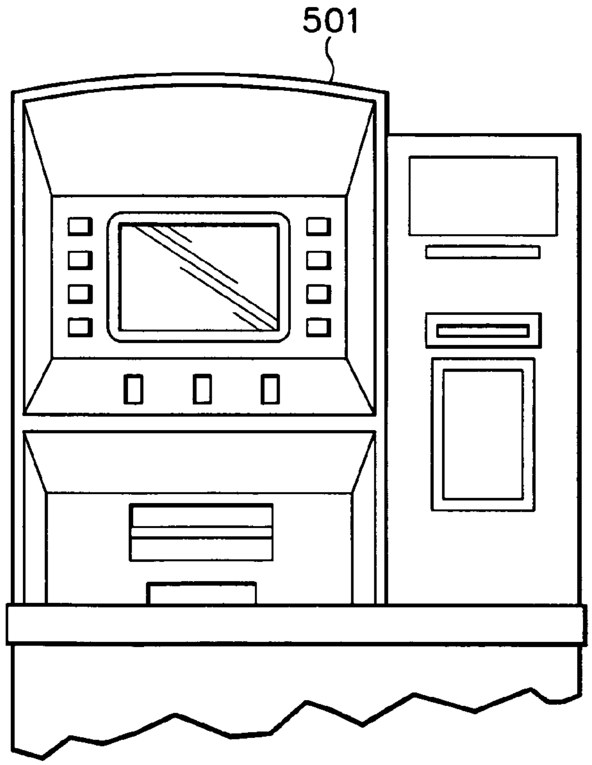

As another example, the printing system can be adapted to be used to visually update a media instrument 500 having the molecular coating 202, such as a ticket, credit or debit card, hotel keycard, club membership card, or copy machine card, or the like. Such instruments 500 conventionally have a machine readable magnetic recording strip with code that is read/updated with each usage. The updates include, for example, the number of copies, rides, attendance, or other value remaining, or hotel room number. Heretofore, these instruments 500 have not provided a means to convey this information in human readable form. Thus, a holder of a rail pass may not know the remaining value of the pass until attempting to use it. This restriction is overcome by coating a surface of the media instrument 500 with the rewritable coating 202 of the present invention. The image formed in the rewritable coating may be erased and reprinted with each transaction using the electrode array printer 103 of the present invention. In a specific embodiment shown in FIGS. 5AA and 5BB, a train ticket 500 may be reprinted with each use at an adapted, state of the art, ticket vending (or gated entrance release) machine 501.

Figure 6A:
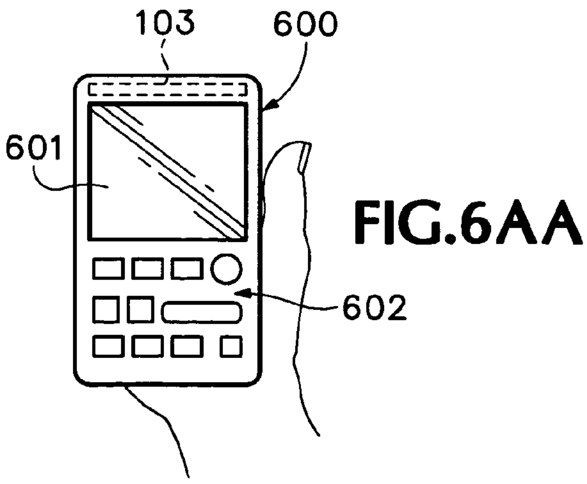
FIG. 6AA depicts an alternative embodiment of a handheld printer in accordance with the present invention as shown in FIG. 1AA.

Moreover, the printer may alternately be made portable and customized to swipe over the surface of a fixed position rewritable sheet surface, e.g., a rewritable packaging label or ticket. Thus, standard inking devices, such as for food price labeling, can be adapted accordingly. FIG. 6AA demonstrates a handheld printer having a screen 601 and control panel 602 for the user to generate context, e.g., a price label, of a particular appearance which will show on the screen 601. The electrode array (shown in phantom block form) 103 can then be swiped across a rewritable medium 105 of appropriate size to print a label.

Figure 3A:
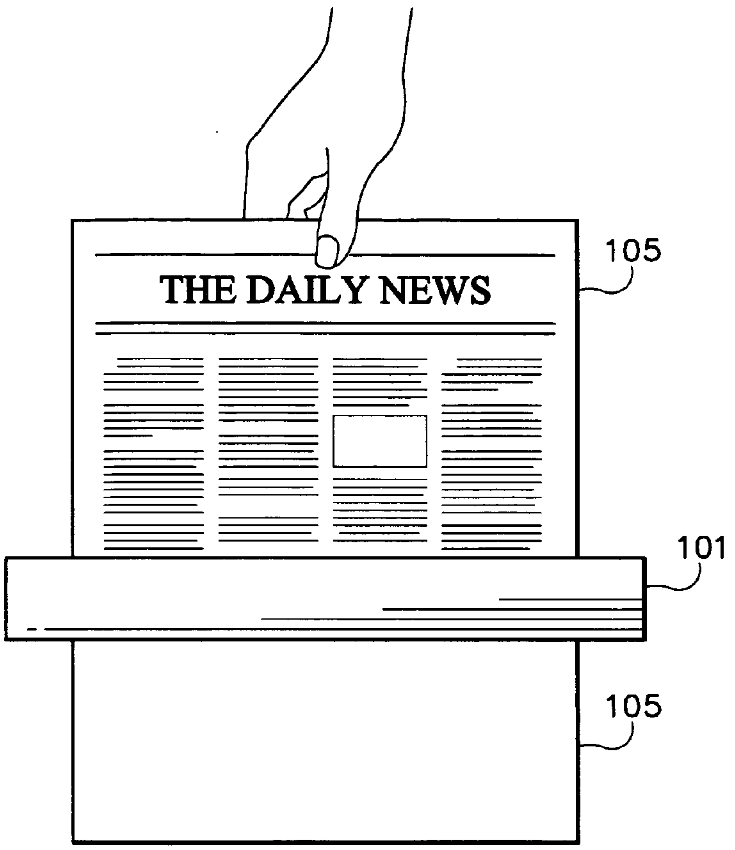

An exemplary specific embodiment for a portable printer is shown in FIG. 3AA. A mobile hard copy apparatus, or printer, 101 in accordance with this example is a page-wide (e.g., 8") device with a small rectangular cross-section (perhaps 1"×1"). The printer 101 is interfaced to a computing apparatus (not shown) in a conventional manner. For optimal energy efficiency, the paper-like rewritable medium 105 sheet may be fed through the printer 101 manually at a feed rate generally of the user's choosing. Once the sheet is removed from the printer it appears and may be read like a standard printed piece of paper. Once read, the paper may be fed back into the printer 101 where the current image is erased and a new image is simultaneously printed. In the preferred embodiment of the media 105, the current print may also be saved for a prolonged period of time as the colorant molecules are bistable. Note that the hard copy apparatus 101 can be configured as a portable facsimile machine by including appropriate fax-modem circuitry in the controller 115 as would be known in the art. Note that to eliminate battery requirements, the feed rollers may incorporate known manner electric generators to drive the electrodes.

Figure 4A:
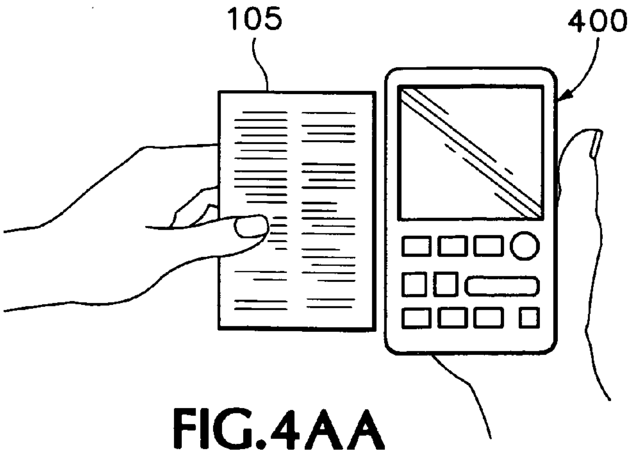
FIG. 4AA is a schematic illustration of a computer appliance embodiment in operation having a printing apparatus in accordance with the present invention as shown in FIG. 1AA.
Figure 4B:
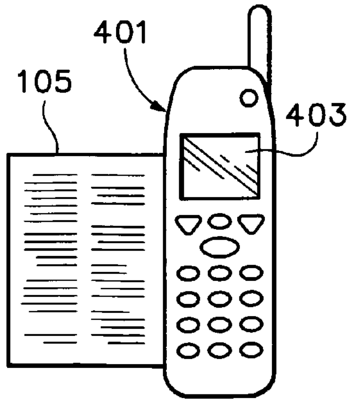
FIG. 4BB is a schematic illustration of a telecommunications apparatus embodiment in operation having a printing apparatus in accordance with the present invention as shown in FIG. 1AA.

Turning to FIG. 4AA, in a second exemplary embodiment, the printer and rewritable sheet are integrated with a mobile, or otherwise portable, computer appliance (personal digital assistant, PDA, shown). The sheet 105 is printed and erased by a sheet-wide electrode array (not seen in this illustration) housed within the appliance 400 as it is extracted through a feed slot in the appliance casing (preferably sized the longest dimension of the casing to provide the maximum print area). The internal printer and rewritable medium sheet 105 provides a convenient valuable accessory for temporary use or sharing of information printable from the PDA. Virtual and physical buttons on the appliance 400 may be used to control the sequence of images and selection of document to be printed. FIG. 4BB is an analogous embodiment for a portable telecommunications apparatus 401, e.g., a cell phone capable of printing out a temporary copy of a downloaded, full, electronic message received via an internet up-link (versus viewing only a couple of lines at a time on the low resolution LCD screen 403.

The rewritable medium 105 sheet may optionally contain a mosaic pixel pattern of different molecular colorants (e.g., cyan, magenta, yellow, black). Such a pattern may be initially imaged through conventional printing means, for example, ink-jet or lithography. The patterned colorants may optionally be printed with a fiducial mark to allow correct sensing of the colorant positions during electronic imaging. The pattern of colorants may be addressed by the electrode array to produce color images. Further details may be gleaned from co-pending application Ser. No. 09/919,394, supra, but is not necessary for a full understanding of the present invention.

The rewritable medium 105 pull sheet of the aforementioned computer/telecommunication appliances is preferably made of a flexible, yet significantly sturdy substrate 201 for repeated usage. The sheet may contain tabs, or other suitable stops, that engage with the printer 103 or appliance 400 upon sheet extraction to prevent sheet loss. Alternatively, the sheet may be mounted on a conventional slide-drawer mechanism having built-in stops and detents that govern the travel of the sheet when printed, viewed and stored.

The foregoing description of the preferred embodiment of the present invention has been presented for purposes of illustration and description. It is not intended to be exhaustive or to limit the invention to the precise form or to exemplary embodiments disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application, thereby to enable others skilled in the art to understand the invention for various embodiments and with various modifications as are suited to the particular use or implementation contemplated. It is intended that the scope of the invention be defined by the claims appended hereto and their equivalents. Reference to an element in the singular is not intended to mean "one and only one" unless explicitly so stated, but rather means "one or more." Moreover, no element, component, nor method step in the present disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for . . . " and no process step herein is to be construed under those provisions unless the step or steps are expressly recited using the phrase "comprising the step(s) of. . . . "

What is claimed is:

1. A printing system comprising:

rewritable media having a bistable, electrochromic, molecular colorant layer susceptible to localized electrical fields; and associated with said media, an electrode subsystem producing said localized electrical fields.

2. The system as set forth in claim 1 further comprising:

a transport for moving a sheet of said media passed said electrode subsystem.

3. The system as set forth in claim 2, the transport further comprising:

at least one media position sensor.

4. The system as set forth in claim 1 further comprising:

means for downloading, storing, sequencing, and printing text and images.

5. The system as set forth in claim 1 configured as a portable hard copy printing apparatus.

6. The system as set forth in claim 1 in a portable computer appliance.

7. The system as set forth in claim 1 in a telecommunications device.

8. The system as set forth in claim 1 wherein said electrode subsystem substantially stationary and configured to print on a sheet of said media as said media is translated passed said electrode subsystem.

9. The system as set forth in claim 1 wherein said colorant layer further comprises:

at least one layer of a molecular colorant coating wherein molecules of the coating are at least bichromal and subjectable to bistable switching between color states under influence of said localized electric field.

10. The system as set forth in claim 9 comprising:

said molecules exhibit an electric field induced band gap change, occurring via a mechanism selected from a group including (1) molecular conformation change or an isomerization, (2) change of extended conjugation via chemical bonding change, and (3) molecular folding or stretching.

11. The system as set forth in claim 2, said transport further comprising:

electrical generators connected to said electrode subsystem for producing said localized electrical fields.

12. The system as set forth in claim 9, the molecular colorant coating further comprising:

a mosaic pixel pattern of primary color pixels such that full color printing is produced by said electrode subsystem on said media.

13. The system as set forth in claim 1, said electrode subsystem further comprising:

means to field address temporally and spatially.

14. A hard copy printing method comprising:

selectively providing localized electric fields, each of said fields conforming to a predetermined picture element size;

transporting a printing medium across said fields such that a bistable electrochromic molecular colorant layer of said medium is subjected to said electric fields; and manipulating said electric fields to produce printed data onto said electrochromic colorant layer.

15. The method as set forth in claim 14 wherein a first polarity of said localized electric fields prints a picture element.

16. The method as set forth in claim 15 wherein a reverse polarity of said first polarity of said localized electric fields erases a picture element.

17. The method as set forth in claim 14 used in a portable hard copy apparatus.

18. The method as set forth in claim 14 used in a portable computer appliance.

19. The method as set forth in claim 14 used in a telecommunications device.

20. The method as set forth in claim 14 wherein said colorant layer is at least one layer of a molecular colorant coating wherein molecules of the coating are at least bichromal and subjectable to bistable switching between color states under influence of said localized electric field.

21. The method as set forth in claim 20 wherein said molecules exhibit an electric field induced band gap change, occurring via a mechanism selected from a group including (1) molecular conformation change or an isomerization, (2) change of extended conjugation via chemical bonding change, and (3) molecular folding or stretching.

22. A method of doing business, the method comprising:

providing a printing apparatus including an electrode subsystem for providing selectively localized electric fields corresponding to molecular colorant picture elements printable from digital data;

providing a rewritable media instrument susceptible to said fields wherein said media instrument is associated with a service and use fees associated therewith; and printing and reprinting legible information on said media instrument associated with said use fee and a current balance with said stationary printing apparatus whenever said media instrument is used in association with said printing apparatus.

23. The method as set forth in claim 22 wherein a first polarity of said localized electric fields prints a picture element.

24. The method as set forth in claim 23 wherein a reverse polarity of said first polarity of said localized electric fields erases a picture element.

25. The method as set forth in claim 22 wherein said business is conducted using a portable hard copy apparatus.

26. The method as set forth in claim 22 wherein said business is conducted using a portable computer appliance.

27. The method as set forth in claim 22 wherein said business is conducted using in a telecommunications device.

28. The method as set forth in claim 22 wherein said picture elements further comprise an electrochromic colorant layer of at least one layer of a molecular colorant coating wherein molecules of the coating are at least bichromal and subjectable to bistable switching between color states under influence of said localized electric field.

29. The method as set forth in claim 28 wherein said molecules exhibit an electric field induced band gap change, occurring via a mechanism selected from a group including (1) molecular conformation change or an isomerization, (2) change of extended conjugation via chemical bonding change, and (3) molecular folding or stretching.

30. A method of doing business of printing hard copy, the method comprising:

receiving digital data representative of a document; and producing an image of said document on a rewritable media having at least one layer of a molecular colorant wherein molecules thereof are at least bichromal and subjectable to bistable switching between color states under influence of localized electric fields.

31. The method as set forth in claim 30 wherein said molecules exhibit an electric field induced band gap change, occurring via a mechanism selected from a group including (1) molecular conformation change or an isomerization, (2) change of extended conjugation via chemical bonding change, and (3) molecular folding or stretching.

32. A method of manufacturing a hard copy system having a print zone, the method comprising:

mounting adjacently to said print zone a subsystem having a plurality of electrodes; and adjusting said electrodes for providing selectively localized electric fields corresponding to picture elements printable from digital data such that adjacently positioned rewritable media having a molecular colorant has molecules of said colorant selectively switched between at least two color states by said fields.

33. The method as set forth in claim 32 further wherein said plurality of electrodes is a linear array for sequentially printing lines of picture elements across said media.

34. The method as set forth in claim 32 wherein said plurality of electrodes is a matrix array for simultaneously printing a matrix of picture elements on said media.

* * * * *